(12) United States Patent
Ray et al.

(10) Patent No.: US 9,619,303 B2
(45) Date of Patent: Apr. 11, 2017

(54) PRIORITIZED CONFLICT HANDLING IN A SYSTEM

(75) Inventors: Harvey Ray, Frederick, CO (US); Christopher Wesneski, The Colony, TX (US); Craig Warner, Coppell, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 186 days.

(21) Appl. No.: 14/368,474

(22) PCT Filed: Apr. 11, 2012

(86) PCT No.: PCT/US2012/033036
§ 371 (c)(1),
(2), (4) Date: Jun. 24, 2014

(87) PCT Pub. No.: WO2013/154549
PCT Pub. Date: Oct. 17, 2013

(65) Prior Publication Data
US 2015/0052308 A1 Feb. 19, 2015

(51) Int. Cl.
| | | |
|---|---|---|
| *G06F 12/00* | (2006.01) | |
| *G06F 9/52* | (2006.01) | |
| *G06F 12/0831* | (2016.01) | |
| *G06F 13/16* | (2006.01) | |
| *G06F 12/0875* | (2016.01) | |

(52) U.S. Cl.
CPC ......... *G06F 9/528* (2013.01); *G06F 12/0831* (2013.01); *G06F 12/0835* (2013.01); *G06F 12/0875* (2013.01); *G06F 13/1642* (2013.01); *G06F 2212/1024* (2013.01); *G06F 2212/2542* (2013.01); *G06F 2212/452* (2013.01); *G06F 2212/621* (2013.01)

(58) Field of Classification Search
CPC .. G06F 9/528; G06F 12/0831; G06F 12/0835; G06F 12/0875; G06F 13/1642; G06F 2212/1024; G06F 2212/2542; G06F 2212/452; G06F 2212/621
See application file for complete search history.

(56) References Cited

U.S. PATENT DOCUMENTS

| | | | |
|---|---|---|---|
| 6,338,122 | B1 | 1/2002 | Baumgartner |
| 6,457,087 | B1 | 9/2002 | Fu |
| 6,681,293 | B1 | 1/2004 | Solomon |
| 6,766,360 | B1 | 7/2004 | Conway |
| 6,928,517 | B1 * | 8/2005 | Englin ............... G06F 12/0811 710/40 |

(Continued)

OTHER PUBLICATIONS

International Searching Authority, The International Search Report and the Written Opinion, Dec. 14, 2012, 9 Pages.

(Continued)

*Primary Examiner* — Charles Rones
*Assistant Examiner* — Nanci Wong
(74) *Attorney, Agent, or Firm* — Trop, Pruner & Hu, P.C.

(57) ABSTRACT

A controller has a cache to store data associated with an address that is subject to conflict resolution. A conflict resolution queue stores information relating to plural transactions, and logic reprioritizes the plural transactions in the conflict resolution queue to change a priority of a first type of transaction with respect to a priority of second type of transaction.

9 Claims, 4 Drawing Sheets

(56) References Cited

U.S. PATENT DOCUMENTS

| | | | |
|---|---|---|---|
| 7,386,681 B2 | 6/2008 | Guthrie | |
| 7,421,544 B1* | 9/2008 | Wright | G06F 9/3004 |
| | | | 711/150 |
| 7,529,800 B2* | 5/2009 | DeSota | G06F 15/173 |
| | | | 709/205 |
| 8,015,248 B2 | 9/2011 | DeSota | |
| 2005/0021921 A1 | 1/2005 | Blackmon | |
| 2007/0022256 A1* | 1/2007 | Cantin | G06F 12/0831 |
| | | | 711/144 |
| 2007/0079075 A1* | 4/2007 | Collier | G06F 12/082 |
| | | | 711/141 |
| 2008/0065873 A1 | 3/2008 | Hall et al. | |
| 2008/0189501 A1* | 8/2008 | Irish | G06F 13/1631 |
| | | | 711/167 |
| 2008/0195759 A1 | 8/2008 | Novik et al. | |
| 2008/0270708 A1 | 10/2008 | Warner | |
| 2009/0006712 A1* | 1/2009 | Ehsan | G06F 12/0815 |
| | | | 711/1 |
| 2009/0150624 A1* | 6/2009 | Resnick | G06F 9/3004 |
| | | | 711/155 |
| 2010/0250850 A1* | 9/2010 | Yang | G06F 9/30043 |
| | | | 711/118 |
| 2011/0016470 A1 | 1/2011 | Cain, III et al. | |
| 2012/0131246 A1* | 5/2012 | Jeong | G06F 13/4217 |
| | | | 710/110 |
| 2013/0117513 A1* | 5/2013 | Brittain | G06F 13/1626 |
| | | | 711/152 |
| 2013/0205098 A1* | 8/2013 | Guthrie | G06F 12/0897 |
| | | | 711/146 |
| 2013/0242677 A1* | 9/2013 | Iyer | G11C 11/412 |
| | | | 365/189.15 |

OTHER PUBLICATIONS

Iyer et al., Switch Cache: A Framework for Improving the Remote Memory Access Latency of CC-NUMA Multiprocessors, Jan. 1999, Texas A&M University (9 pages).

* cited by examiner

PRIORITIZED CONFLICT HANDLING IN A SYSTEM

BACKGROUND

A multiprocessor system can include multiple processors that can be associated with respective local memories. The multiprocessor system can be arranged as a non-uniform memory access (NUMA) system in which one processor can remotely access the local memory associated with another processor.

BRIEF DESCRIPTION OF THE DRAWINGS

Some embodiments are described with respect to the following figures.

DETAILED DESCRIPTION

Figure 1:
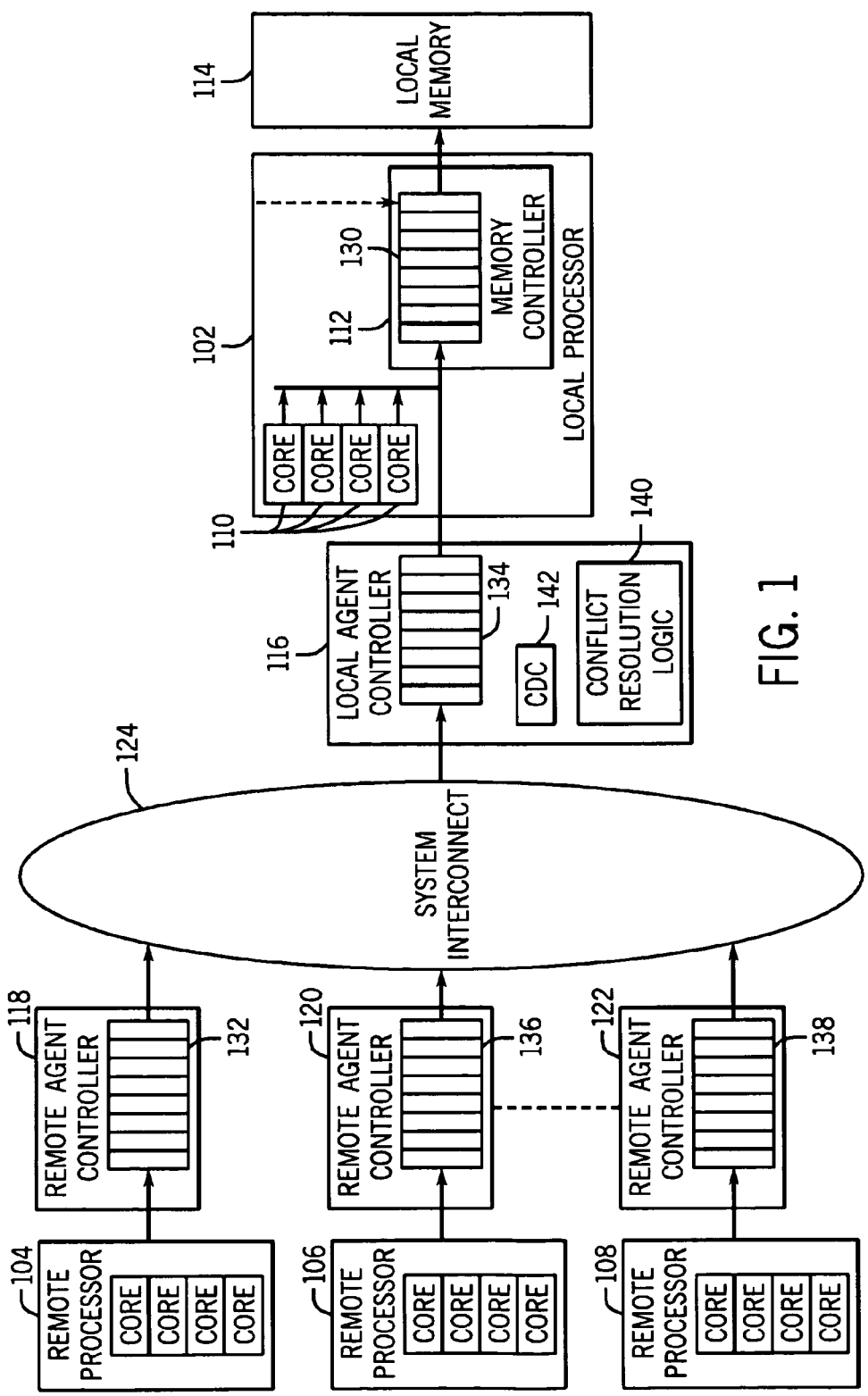
FIG. 1 is a block diagram of an example system that incorporates some implementations.

In a non-uniform memory access (NUMA) multiprocessor system, processors can be interconnected by a system interconnect (including buses or links), or alternatively, processors can be interconnected using a connection infrastructure that includes intermediate controllers as well as a system interconnect. The processors of the multiprocessor system can be associated with respective local memories. Each processor is able to access its local memory. Additionally, a processor can also remotely access the local memory of another processor. A "memory" can refer to a storage device or collection of storage devices, which can include integrated circuit or semiconductor memory device(s) or other types of storage devices.

In a NUMA multiprocessor system, a processor is able to access its local memory with lower latency than access of the local memory by a remote processor. A local processor is able to access the local memory over a relatively high-speed interconnect. A memory transaction issued by the local processor to access data in the local memory is referred to as a local memory transaction. In contrast, a remote memory transaction from a remote processor travels from the remote processor through an intermediate system interconnect (and possibly intermediate controllers) before the remote memory transaction can reach the memory controller of the local memory.

In addition to the increased latency associated with a remote memory transaction (as compared to a local memory transaction) due to the different paths traveled by the remote and local memory transactions, performance of synchronization in a multiprocessor system can also add to latency associated with the remote memory transaction. Synchronization enables concurrent processes or threads to coordinate accesses to a shared resource. Synchronization ensures that multiple requestors (read requestors and/or write requestors) of data at the coherent memory location do not see inconsistent versions of the data.

To access a coherent memory location, a requestor (e.g. a thread or other execution unit that executes on a processor) may acquire a lock associated with the memory location. The lock can be in the form of a semaphore, for example, which is a variable or other information element that controls access by multiple requestors of a common resource (e.g. the coherent memory location in a shared memory device). In other examples, other types of locks can be employed. When a first requestor holds a lock on a particular piece of data (such as data in a coherent memory location), then access to the particular piece of data by another requestor is restricted.

Due to proximity, a thread or other execution unit executing on a local processor may have an advantage in acquiring locks of coherent memory locations in local memory, over threads or other execution units executing on remote processor(s). This advantage in acquiring locks of coherent memory locations can lead to increased lock acquisition latency for remote memory transactions as compared to local memory transactions.

In addition, as part of synchronization, conflict resolution can be performed for multiple memory transactions that seek to access the same memory location (e.g. the memory transactions are directed to the same address associated with the memory location, which results in an address conflict). In some cases, conflict resolution can be performed by serializing the memory transactions, such that ordering and memory consistency can be preserved.

A remote memory transaction may be subjected to conflict resolution at multiple points in the multiprocessor system—for example, the remote memory transaction may be subjected to conflict resolutions in multiple intermediate controllers as well as in a memory controller of a local processor. In contrast, a local memory transaction may be subjected to conflict resolution at one point—the memory controller. If serialization is performed at each of multiple conflict resolution points for the remote memory transaction, then the remote memory transaction may experience higher latency due to conflict resolution as compared to a local memory transaction.

In accordance with some implementations, an intermediate controller (also referred to as an "agent controller" in the ensuing discussion) is configured to reduce the latency of remote memory transactions, while maintaining the ability to properly synchronize multiple transactions that are attempting to access the same address (resulting in an address conflict). The agent controller is able to perform prioritized conflict handling that reduces the imbalance between local and remote memory transactions that are contending for a lock of a local memory location. In some implementations, the prioritized conflict handling can be implemented entirely in hardware. In other implementations, the prioritized conflict handling can be performed by a combination of hardware and machine-readable instructions (which can execute on the hardware).

FIG. 1 is a block diagram of an example multiprocessor system that has multiple processors 102, 104, 106, and 108. Although four processors are depicted in FIG. 1, note that in other examples, the multiprocessor system can include different numbers of processors. In some examples, the processor 102 includes multiple processing cores 110. Also, the processor 102 is integrated with a memory controller 112 that controls access of a local memory 114 that is connected to the processor 102. Each of the other processors 104, 106, and 108 similarly includes multiple processing cores and a memory controller. In other examples, instead of having multiple processing cores in a processor, the processor can include just one processing core.

For purposes of discussion, the processor 102 is considered a local processor, associated with the local memory 114. The processors 104, 106, and 108 are considered remote processors, in the sense that such remote processors are able to remotely access the local memory 114 associated with the local processor 102.

Although not depicted in FIG. 1, each of the remote processors 104, 106, and 108 can also be connected to a respective memory. In a different context, the local processor 102 can be considered a remote processor that is capable of accessing a local memory of one of the processors 104, 106, and 108.

In implementations according to FIG. 1, each of the processors 102, 104, 106, and 108 is connected to a respective agent controller 116, 118, 120, and 122. The agent controllers 116, 118, 120, and 122 are interconnected to each other over a system interconnect 124 (including buses or links). Although FIG. 1 shows each processor being connected to a respective agent controller, it is noted that multiple processors can be connected to an agent controller in other examples. Also, in further examples, a processor can also be connected to the system interconnect 124 without passing through an agent controller.

Although the agent controllers 116, 118, 120, and 122 are depicted as being separate from their respective processors 102, 104, 106 and 108, in different examples, an agent controller can be integrated into a respective processor. Thus, an "agent controller" can refer to a controller that is outside of an associated processor, or integrated into the associated processor. In implementations where the agent controller is separate from the respective processor, the agent controller can be implemented as an application-specific integrated circuit (ASIC) device, programmable gate array (PGA), or other type of control chip. An agent controller can perform various defined tasks, including synchronization tasks, data communication tasks, and other tasks.

In the ensuing discussion, the agent controller 116 is referred to as a "local agent controller," while the agent controllers 118, 120, and 122 are referred to as "remote agent controllers."

The local processor 102 is able to issue local memory transactions (read transactions, write transactions, etc.) to the local memory 114. Such local memory transactions are issued by threads or other execution units executing on the processing cores 110. A local memory transaction from a processing core 110 is communicated to the memory controller 112, which then issues access commands to the local memory 114 to perform a read or write of the local memory transaction.

A remote processor (104, 106, or 108) can issue a remote memory transaction to the local memory 114. This remote memory transaction is passed through a respective remote agent controller 118, 120 or 122, over the system interconnect 124, through the local agent controller 116, and through the memory controller 112 of the local processor 102 to the local memory 114. The remote memory transaction can be a read transaction or a write transaction or other type of transaction.

The memory controller 112 of the local processor 102 is also able to issue a local snoop transaction. A local snoop transaction can be performed in response to a local memory transaction (issued from a processing core 110 in the local processor 102) if the memory controller 112 detects that a remote processor may be an owner of the memory location that is the target of the local memory transaction. The memory controller 112 can track previous remote read transactions to determine remote ownership of memory locations associated with the local memory 114. Whenever a local memory transaction attempts to access one of the memory locations that is remotely owned, the memory controller 112 in the local processor 102 issues a local snoop transaction to the local agent controller 116, which in turn sends the local snoop transaction to the remote processor that owns the accessed memory location. The local snoop transaction sent to the remote processor can cause the remote processor to perform various tasks, including for example: initiating a writeback transaction if the remote processor has modified the data that is the subject of the local snoop transaction, invalidating the data at the remote processor, and so forth. The writeback transaction causes the modified data to be written back to the local memory 114 to update the corresponding memory location (to ensure that the local memory transaction that caused the local snoop transaction is working with the most up-to-date version of the data).

In examples according to FIG. 1, conflict resolution among memory transactions attempting to access the same memory location (which causes an address conflict) can be performed at various points, including at each of the agent controllers, and at the memory controllers in the various processors. A local memory transaction generated by a processing core 110 in the local processor 102 is subjected to possible conflict resolution in the memory controller 112. Memory transactions that are directed to the same memory address are placed into a conflict resolution queue 130 in the memory controller 112.

Placing memory transactions in a conflict resolution queue refers to storing information relating to the memory transactions (e.g. information containing the respective commands and any associated data, or information pointing to where the commands and any associated data are stored).

In some examples, conflict resolution at the memory controller 112 involves serializing the memory transactions such that the memory transactions in the conflict resolution queue 130 are executed one at a time by the memory controller 112.

A remote memory transaction for accessing the local memory 114, such as from the remote processor 104, is subjected to conflict resolution at three possible points: the remote agent controller 118, the local agent controller 116, and the memory controller 112 of the local processor 102. The remote agent controller 118 includes a conflict resolution queue 132 in which memory transactions associated with an address conflict are placed. Similarly, the local agent controller 116 includes a conflict resolution queue 134 into which memory transactions associated with an address conflict are placed. The remote agent controllers 120 and 122 similarly include their respective conflict resolution queues 136 and 138.

Note that the conflict resolution queue 134 in the local agent controller 116 can store the following memory transactions associated with an address conflict: remote memory transactions directed to a particular address, and local snoop transactions for the particular address.

Although just one conflict resolution queue is depicted in each of the agent controllers 116, 118, 120, 122, and in the memory controller 112, it is noted that each of the agent controllers and the memory controller can include multiple conflict resolution queues, where each conflict resolution queue is provided for a corresponding address. Thus, where there are multiple conflict resolution queues in a controller (agent controller or memory controller), memory transactions having an address conflict with respect to a first address can be placed in a first conflict resolution queue, memory transactions having an address conflict with respective to a second address can be placed in a second conflict resolution queue, and so forth.

If a remote memory transaction, such as from the remote processor 104, is subjected to conflict resolution in each of the three conflict resolution queues 132, 134, and 130, then such remote memory transaction is associated with a larger latency than would be experienced by a local memory transaction, which is subjected to possible conflict resolution at just one point, the conflict resolution queue 130 of the memory controller 112.

In accordance with some implementations, to address the advantage that local memory transactions have over remote memory transactions in the conflict resolution hierarchy, the local agent controller 116 can implement a prioritized conflict handling mechanism. This prioritized conflict handling mechanism includes conflict resolution logic 140 and a conflict data cache 142, both located in the local agent controller 116. Although not shown, the other agent controllers 118, 120, and 122 can each also include its respective conflict resolution logic and conflict data cache.

The conflict data cache 142 is used to store data that is the subject of conflict resolution in the local agent controller 116. For example, if the local agent controller 116 detects multiple memory transactions for the same address of the local memory 114, the local agent controller 116 would store data referred to by the address into an entry (e.g. line) of the conflict data cache 142. The conflict data cache 142 can be relatively small, since conflicts may be relatively rare. In some examples, the conflict data cache 142 can include as few as eight entries (where each entry can store data corresponding to a specific memory location having a predefined size). In other examples, the conflict data cache 142 can have different numbers of entries.

Each entry of the conflict data cache 142 can include the following elements: a data block (which stores the data of the corresponding memory location), a tag (which contains a portion of the address that refers to the corresponding memory location), flag bits (to indicate whether the data in the entry is valid/invalid and dirty/non-dirty), and lock information.

The lock information in an entry of the conflict data cache 142 allows a remote memory transaction to acquire a lock of the data in the entry of the conflict data cache. This lock can be acquired by setting the lock information in the conflict data cache entry to a predetermined value.

Figure 2:
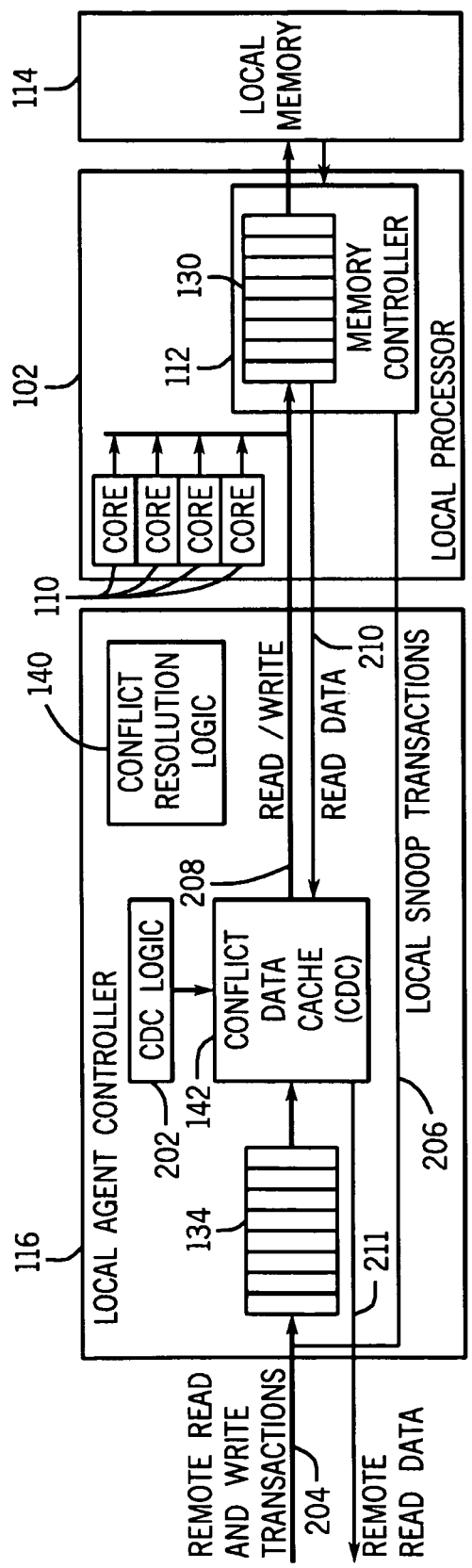
FIG. 2 is a block diagram of a local agent controller, a local processor, and a local memory, in accordance with some implementations.

Reference is made to FIGS. 1 and 2 in the ensuing discussion. FIG. 2 shows the local agent controller 116 receiving remote read and write transactions (204) from a remote processor (or remote processors), and receiving local snoop transactions (206) from the memory controller 112 of the local processor 102. In response to a remote read or write transaction (204), the local agent controller 116 passes a corresponding read or write transaction (208) to the memory controller 112 of the local processor 102. Read data (210) retrieved from the local memory 114 is returned from the memory controller 112 to the local agent controller 116 in response to a read transaction (208). The read data (210) can be added to the conflict data cache 142.

In response to a remote read transaction received by the local agent controller 116, logic 202 (referred to as "CDC logic") associated with the conflict data cache 142 determines if there is a cache hit in the conflict data cache 142 (in other words, whether the conflict data cache 142 contains data associated with the memory location referenced by the address of the remote read transaction). A determination of cache hit in the conflict data cache 142 is accomplished by comparing a portion of an address of the remote read transaction with the tag in the conflict data cache 142.

If there is a cache hit, then the data can be retrieved from the conflict data cache 142 and returned as remote read data (211) to the requesting remote processor in response to the remote read transaction. Satisfying a remote read transaction from the conflict data cache 142 improves performance of the remote read transaction (by reducing read latency). The reduced latency results because the remote read transaction that can be satisfied from the conflict data cache 142 does not have to be passed through the local processor 102 to the local memory 114. Moreover, satisfying a remote read transaction from the conflict data cache 142 eliminates having to perform conflict resolution in the local processor 102 due to the remote read transaction.

As noted above, a conflict data cache entry can include a dirty bit (part of the flag bits) to indicate whether or not the data in the conflict data cache entry is dirty or non-dirty. Data is dirty if the data in the conflict data cache entry is the most up-to-date version of the data, with copies of the data at the local memory 114 being out-of-date. For example, a remote write transaction (204) that has a cache hit in the conflict data cache 142 can cause data in the conflict data cache 142 to be updated, which would cause the dirty bit to be set to a value indicating that the data in the corresponding conflict data cache entry is dirty (modified).

In addition to the conflict data cache 142, the conflict resolution logic 140 in the local agent controller 116 is able to further reduce the latency of remote memory transactions by re-prioritizing certain transactions in the conflict resolution queue 134. In some implementations, the conflict resolution logic 140 allows a remote read transaction to bypass a conflicting local snoop transaction in the conflict resolution queue 134. Alternatively, a local snoop transaction in the conflict resolution queue 134 can be deferred when a remote read transaction is present in the conflict resolution queue 134, which effectively allows the remote read transaction to have a higher priority. By being able to promote a remote read transaction in the conflict resolution queue 134 (ahead of a prior conflicting local snoop transaction), the priority of the remote read transaction is increased over the priority of the local snoop transaction.

As noted above, a local snoop transaction is issued by the local processor 102 in response to a local read transaction. The local read transaction cannot complete until a response is received to the local snoop transaction. By deferring the local snoop transaction in the local agent controller 116, the local agent controller 116 effectively throttles the ability of the local processor 102 to access a locally-stored lock (for a memory location in the local memory 114), to thus improve the ability of the remote read transaction to access the memory location of the local memory 114 (either from the local memory 114 or from the conflict data cache 142).

In some examples, a local snoop transaction should not be deferred indefinitely, since a timeout (during execution of a thread or execution unit that issued the respective local read transaction) may occur that can result in errors in the system. To prevent starvation of a local snoop transaction, a counter or timer can be employed in the conflict resolution logic 140; expiration of the counter or timer causes overriding of the prioritization of remote read transactions over conflicting local snoop transactions (or alternatively, stops the deferment of the local snoop transaction).

Figure 3:
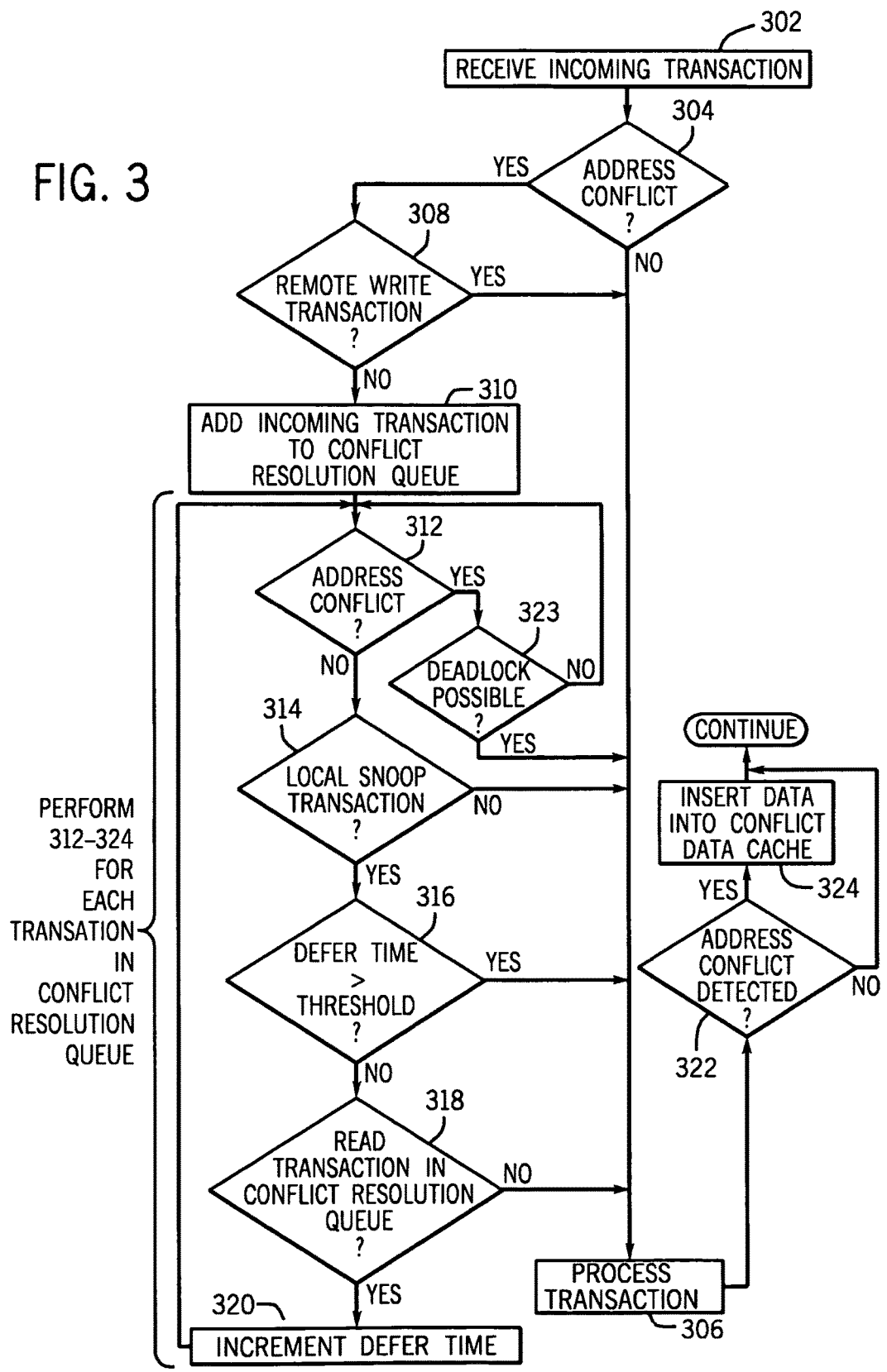
FIGS. 3 and 4 are flow diagrams of processes according to various implementations.

FIG. 3 is a flow diagram of a process of prioritized conflict handling according to some implementations. The process of FIG. 3 can be performed by the conflict resolution logic 140, for example. The process receives (at 302) an incoming transaction targeted to an address of the local memory 114. The incoming transaction can be a remote read transaction, a remote write transaction, and a local snoop transaction.

The process determines (at 304) whether the incoming transaction has an address conflict with another transaction that is in progress or that is in the conflict resolution queue 134. If there is no address conflict, then the incoming transaction can be processed (at 306). Processing the transaction at 306 can involve issuing a read to the local memory 114, issuing a write to the local memory 114, accessing the conflict data cache 142, receiving a response from the memory controller 112, and/or issuing a response to a requesting remote processor.

If the process determines (at 304) that there is an address conflict, the process determines (at 308) whether the incoming transaction is a remote write transaction. If so, the remote write transaction is promoted to the head of the line, and is allowed to be processed (at 306). In other words, the remote write transaction has priority over a prior remote read transaction or a prior local snoop transaction associated with the same address. Processing the remote write transaction involves issuing the write transaction to the memory controller 112 of a local processor 102.

If the process determines (at 308) that the incoming transaction is not a remote write transaction, then the incoming transaction (which can be a remote read transaction or a local snoop transaction) is added (at 310) to the conflict resolution queue 134.

Tasks 312-324 of FIG. 3 discussed below are iteratively performed in sequence for each of the transactions in the conflict resolution queue 134. If there are n (n>1) transactions in the conflict resolution queue 134, then the tasks 312-324 are iteratively performed n times, one for each transaction in the conflict resolution queue 134.

The process determines (at 312) if there is an address conflict between a currently considered transaction (in the conflict resolution queue 134) with an in-progress transaction. Such address conflict can be removed once the in-progress transaction has completed its operation. If the address conflict with an in-progress transaction is no longer present (following the path from the decision block 312), then the currently considered transaction can potentially be removed from the conflict resolution queue 134 for execution. The process checks (at 314) if the currently considered transaction is a local snoop transaction. If not (which can mean that the currently considered transaction is a remote read transaction), then the currently considered transaction is processed (at 306).

However, if the currently considered transaction is determined (at 314) to be a local snoop transaction, then the process checks (at 316) to determine whether the local snoop transaction has been deferred for more than some predefined threshold amount of time. If the local snoop transaction has been deferred for more than the predefined threshold amount of time, then the local snoop transaction is processed (at 306). This reduces the likelihood of a time-out event occurring due to excessive delay of the local snoop transaction.

If the local snoop transaction has not been deferred more than the predefined threshold amount of time, then the process next determines (at 318) whether there is a remote read transaction in the conflict resolution queue 134 that conflicts with the local snoop transaction. If so, then the defer time is incremented (at 320) and the process returns to task 312. However, if there is not a conflicting remote read transaction in the conflict resolution queue 134, then the local snoop transaction can be processed (at 306).

Tasks 318 and 320 act to cause the local snoop transaction to be deferred unless one of two conditions is present: (1) the defer time is greater than the predefined threshold amount of time, or (2) there is no other conflicting remote read transaction in the conflict resolution queue 134.

If the currently considered transaction in the conflict resolution queue 134 is determined (at 312) to have an address conflict with an in-progress transaction, then the process determines (at 323) whether a deadlock may be possible. A deadlock can occur when there is a circular dependency in which a first transaction depends upon completion of a second transaction, which in turn depends upon completion of the first transaction. Such circular dependency can prevent both the first transaction and the second transaction from completing, which results in deadlock.

Circular dependency can occur in cases where an address conflict for a given address occurs at two or more points in the system. As an example, a remote read transaction is received at the local agent controller 116 and is provided to the memory controller 112 of the local processor 102. This remote read transaction is labeled "Read 2," and conflicts with an earlier local read transaction ("Read 1") issued by a local processing core 110 in the local processor 102. The local read transaction (Read 1) causes the memory controller 112 to issue a local snoop transaction to the local agent controller 116 while the local agent controller 116 is still processing the remote read transaction (Read 2). This creates the following circular dependency:

Read 2→Read 1→Snoop (on behalf of Read 1)→Read 2, where A→B indicates a dependency of A on B.

To address the foregoing deadlock, the snoop transaction should be allowed to prematurely exit the conflict resolution queue 134 to break the circular dependency.

As shown in FIG. 3, if the process detects (at 323) that a deadlock is possible, then the currently considered memory transaction is allowed to be processed (at 306). However, if deadlock is not possible, then the process returns to task 312 to continue the process of FIG. 3.

As further shown in FIG. 3, from task 306 (in which processing of a transaction is performed), the process next determines (at 322) whether an address conflict has been detected for the transaction. If so, data associated with the transaction can be inserted (at 324) into the conflict data cache 142.

Figure 4:
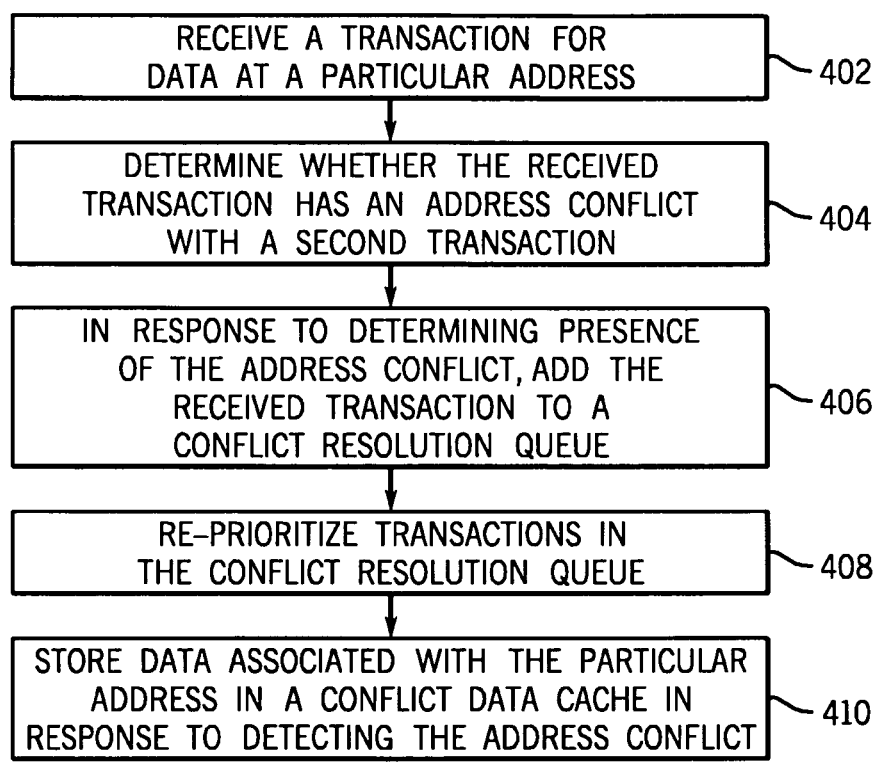

FIG. 4 illustrates a flow diagram of a process according to further implementations. The process can be performed by logic in the local agent controller 116. The process receives (at 402) a transaction for data at a particular address. The process determines (at 404) whether the received transaction has an address conflict with a second transaction in the local agent controller 116. In response to determining the address conflict is present, the process adds (at 406) the received transaction to the conflict resolution queue 134.

The process can re-prioritize (at 408) transactions in the conflict resolution queue 134 to change a priority of a first type of transaction with respect to a priority of a second type of transaction. For example, a local snoop transaction in the conflict resolution queue 134 can be deferred to allow a remote read transaction to have greater priority.

In addition, the process stores (at 410) data associated with the particular address in the conflict data cache 142 in response to detecting the address conflict. Such data may have been retrieved from the local memory 114 in response to a remote read transaction to the particular address.

The logic 140 and 202 of the local agent controller 116 can be implemented as hardware, or implemented as a combination of machine-readable instructions and hardware. In the latter case, the machine-readable instructions can be executed on a processing circuit, which can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method, comprising:
receiving an incoming transaction;
determining if the incoming transaction has an address conflict with any in-progress transaction or a pending transaction in a conflict resolution queue;
if the incoming transaction has an address conflict and is a remote write transaction, processing the incoming transaction;
if the incoming transaction has an address conflict and is not a remote write transaction, adding the incoming transaction to the conflict resolution queue;
for each respective transaction in the conflict resolution queue, including the incoming transaction:
if the respective transaction does not have an address conflict with any in-progress transaction and the respective transaction is not a local snoop transaction, processing the respective transaction;
if the respective transaction is a local snoop transaction and a defer time of the local snoop transaction is greater than a threshold or there is no conflicting read transaction in the conflict resolution queue, processing the respective transaction; and
if the respective transaction is a local snoop transaction and the defer time of the local snoop transaction is less than the threshold and there is a conflicting read transaction in the conflict resolution queue, incrementing the defer time of the respective transaction and retaining the respective transaction in the conflict resolution queue.

2. The method of claim 1, wherein processing the respective transaction comprises returning remote read data from a conflict data cache without sending the respective transaction to a memory controller.

3. The method of claim 1, wherein if the incoming transaction has an address conflict and is a remote write transaction, processing the incoming transaction comprises writing data to a conflict data cache.

4. A system comprising:
a processor comprising a memory controller;
a memory to store data accessible by the memory controller;
a local agent controller separate from the memory and coupled to the memory controller, the local agent controller to:
receive an incoming transaction;
determine if the incoming transaction has an address conflict with any in-progress transaction or a pending transaction in a conflict resolution queue;
if the incoming transaction has an address conflict and is a remote write transaction, process the incoming transaction;
if the incoming transaction has an address conflict and is not a remote write transaction, add the incoming transaction to the conflict resolution queue;
for each respective transaction in the conflict resolution queue, including the incoming transaction:
if the respective transaction does not have an address conflict with any in-progress transaction and the respective transaction is not a local snoop transaction, process the respective transaction;
if the respective transaction is a local snoop transaction and a defer time of the local snoop transaction is greater than a threshold or there is no conflicting read transaction in the conflict resolution queue, process the respective transaction; and
if the respective transaction is a local snoop transaction and the defer time of the local snoop transaction is less than the threshold and there is a conflicting read transaction in the conflict resolution queue, increment the defer time of the respective transaction and retain the respective transaction in the conflict resolution queue.

5. The system of claim 4, wherein the local agent controller is to process the respective transaction by returning remote read data from a conflict data cache without sending the respective transaction to a memory controller.

6. The system of claim 4, wherein the local agent controller is to process the incoming transaction by writing data to a conflict data cache if the incoming transaction has an address conflict and is a remote write transaction.

7. A local agent controller comprising logic to:
receive an incoming transaction;
determine if the incoming transaction has an address conflict with any in-progress transaction or a pending transaction in a conflict resolution queue;
if the incoming transaction has an address conflict and is a remote write transaction, process the incoming transaction;
if the incoming transaction has an address conflict and is not a remote write transaction, add the incoming transaction to the conflict resolution queue;
for each respective transaction in the conflict resolution queue, including the incoming transaction:

if the respective transaction does not have an address conflict with any in-progress transaction and the respective transaction is not a local snoop transaction, process the respective transaction;

if the respective transaction is a local snoop transaction and a defer time of the local snoop transaction is greater than a threshold or there is no conflicting read transaction in the conflict resolution queue, process the respective transaction; and if the respective transaction is a local snoop transaction and the defer time of the local snoop transaction is less than the threshold and there is a conflicting read transaction in the conflict resolution queue, increment the defer time of the respective transaction and retain the respective transaction in the conflict resolution queue.

8. The local agent controller of claim 7, comprising further logic to process the respective transaction by returning remote read data from a conflict data cache without sending the respective transaction to a memory controller.

9. The local agent controller of claim 7, comprising further logic to process the incoming transaction by writing data to a conflict data cache if the incoming transaction has an address conflict and is a remote write transaction.

* * * * *